United States Patent

[11] 3,608,064

[72] Inventor Anthony H. Lamb
   66 King St., Hillside, N.J. 07205
[21] Appl. No. 864,486
[22] Filed Oct. 7, 1969
[45] Patented Sept. 21, 1971

[54] MILK-BUFFERED ASPIRIN
   7 Claims, 4 Drawing Figs.
[52] U.S. Cl. .................................................... 424/36,
   424/230, 424/359
[51] Int. Cl. ..................................................... A61j 3/07,
   A61j 3/10
[50] Field of Search ........................................... 424/36,
   230, 359

[56] References Cited
   UNITED STATES PATENTS

| | | | |
|---|---|---|---|
| 1,486,373 | 3/1924 | Gerngross et al. ............ | 424/230 |
| 2,519,487 | 8/1950 | Macek ........................... | 424/359 X |
| 3,094,464 | 6/1963 | Joullie et al. .................. | 424/230 X |
| 3,243,347 | 3/1966 | Kracauer ....................... | 424/359 X |
| 3,382,150 | 5/1968 | Grass et al. ................... | 424/184 X |
| 3,501,571 | 3/1970 | Yen ............................... | 424/184 X |

Primary Examiner—Shep K. Rose
Attorney—Rudolph J. Jurick

ABSTRACT: A mixture of aspirin and powdered milk.

PATENTED SEP 21 1971 3,608,064
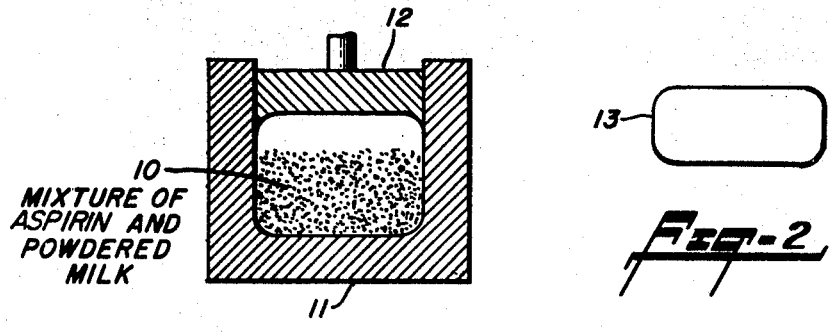
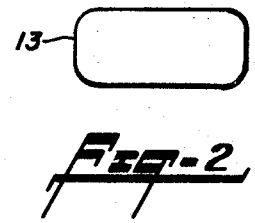
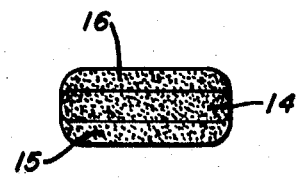
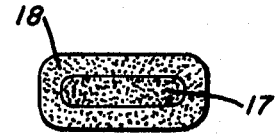
ANTHONY H. LAMB
INVENTOR.
BY Rudolph J. Junick
ATTORNEY

MILK-BUFFERED ASPIRIN

BACKGROUND OF THE INVENTION

The mucosa coating normally protects the stomach lining against attack by the juices normal to food digestion. Often a puncture is made in the mucosa coating either by an excessively acid condition or by sharp solid objects such as a bone chip, seafood shell, etc. Small punctures occuring at infrequent intervals result in no permanent damage as the mucosa coating is viscous and self-sealing. However, pronounced bleeding occurs when the puncture is enlarged, sometimes leading to ulceration. Chemical antacids which coat the stomach wall tend to reduce bleeding by neutralizing excessive stomach acidity but such antacids can cause other troubles by over alkalization.

Individuals having weak stomachs or an ulcer condition are advised against taking aspirin, since aspirin acts as an irritant and often aggravates the condition. When aspirin has been combined with various buffering agents, present compounds of this class do not alleviate or minimize stomach bleeding.

In accordance with this invention, aspirin is mixed with powdered milk. When first introduced into the stomach, the milk provides a natural alkaline barrier which minimizes the possible effects of aspirin and, also, provides nutritional value.

SUMMARY OF THE INVENTION

In one embodiment of the invention, gelatin capsules are filled with a mixture of powdered aspirin and powdered milk. In another embodiment of the invention the mixture of powdered aspirin and milk is compressed into a tablet at a pressure such that the tablet does not crumble under normal conditions yet is readily chewable.

An object of this invention is the provision of aspirin with a milk buffer in solid form.

An object of this invention is the provision of a mixture of aspirin and powdered milk.

An object of this invention is the provision of a tablet comprising a mixture of powdered aspirin and powdered milk.

The above-stated and other objects and advantages of the invention will become apparent from the following description taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a central, cross-sectional view of a press for forming a mixture of aspirin and powdered milk into a tablet;

FIG. 2 is a front elevational view of the tablet;

FIG. 3 is a central cross-sectional view of a tablet made in accordance with another embodiment of the invention; and FIG. 4 is a similar view of a tablet formed in accordance with another embodiment of the invention.

DESCRIPTION OF THE PREFERRED EMBODIMENTS

Powdered milk, made from whole or nonfat liquid milk by conventional processes is combined with aspirin. The term 'powdered milk' as used in the following description and in the claims, refers to milk from which substantially all water has been removed, the remaining milk solids being either a fine powder or small crystals having a moisture content of not more than 5 percent. In certain embodiments of the invention, the aspirin is used in a powdered or granular form. It will be understood that in the term 'powdered aspirin' includes aspirin in granular or powder form.

In one embodiment of the invention, a substantially homogenous mixture is formed of powdered aspirin and powdered milk and such mixture is placed into conventional, gelatin capsules. Preferably, the powdered milk comprises at least 50 percent of the mixture.

In accordance with another embodiment of the invention, the above-described mixture is formed into a tablet in a conventional tablet-making machine. For example, as shown in FIG. 1, an appropriate quantity of the mixture 10 is placed into a mold 11 and compressed by means of a plunger 12, thereby to produce a generally disclike table 13 as shown in FIG. 2. A pressure of the order of 2–5 tons per square inch applied to plunger results in a tablet having a crush strength of 10–20 pounds per square inch, the higher crush strength corresponding to the higher pressure. By applying such pressure in the formation of the tablet, the tablet has a thin, smooth, shiny outer surface, presenting a semiglazed appearance. This surface, which may be likened to a mild case hardening, is of such homogenity and density as to constitute and envelop forming an effective moisture barrier to prevent tablet deterioration prior to its consumption.

Referring again to FIG. 1, instead of loading the mold with a mixture of granular aspiring and powdered milk, a lower layer of powdered milk is formed in the mold, then a layer of granular aspirin and then a top layer of powdered milk. The resulting tablet will have a cross-sectional appearance as shown in FIG. 3, that is, a layer of compressed aspirin 14 sandwiched between the layers 15 and 16 of compressed powdered milk.

Another form of the tablet is shown in the central, cross-sectional view of FIG. 4. Here, a previously compressed tablet 17 of aspirin is encased within a shell 18 of compressed, powdered milk. To form such tablet the mold has a larger cross-sectional diameter than the compressed aspirin tablet. A layer of powdered milk is first placed into the mold. The aspirin tablet then is centered upon such layer, after which the mold is filled to an appropriate level with the powdered milk.

Having now described the invention what I desire to protect by Letters Patent of the United States is set forth in the following claims:

1. A new product comprising a combination of aspirin and powdered milk.

2. The dosage unit form as recited in claim 1, wherein the aspirin is in powder form, and is intimately mixed with a substantially equal quantity of powdered milk, and wherein the mixture is contained in a digestible capsule.

3. The dosage unit form as recited in claim 1, wherein the aspirin is in powder form and is mixed with powdered milk to form a substantially homogenous mixture, which mixture is compressed into a tablet.

4. The dosage unit form as recited in claim 3, wherein the mixture comprises substantially 50 percent powdered milk.

5. The dosage unit form as recited in claim 4, wherein the tablet has a crush strength of 10–20 pounds per square inch.

6. The dosage unit form as recited in claim 1, wherein the aspirin is in the form of a compressed tablet encased within a shell of compressed, powdered milk.

7. The dosage unit form as recited in claim 1, wherein the aspirin is in powdered form, and wherein the powdered aspirin and powdered milk comprise a tablet having an inner layer of aspirin and outer layers of powdered milk.